March 10, 1925.                C. C. TAYLOR                1,528,859
                              PIPE OR CONDUIT
                            Filed Feb. 28, 1923
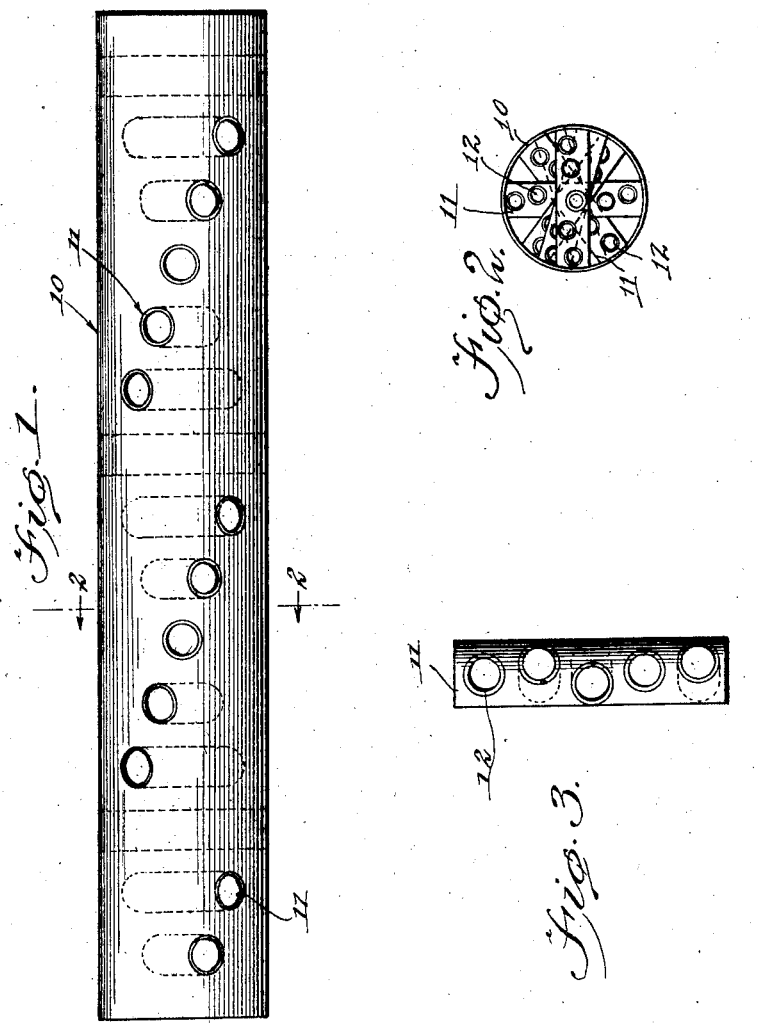
Inventor
C.C. Taylor,
By
      Attorney Patented Mar. 10, 1925.

1,528,859

UNITED STATES PATENT OFFICE.

CLAUDY CLARENCE TAYLOR, OF MOUNDS, ILLINOIS.

PIPE OR CONDUIT.

Application filed February 28, 1923. Serial No. 621,804.

*To all whom it may concern:*

Be it known that I, CLAUDY CLARENCE TAYLOR, a citizen of the United States, and a resident of Mounds, in the county of Pulaski and State of Illinois, have invented certain new and useful Improvements in Pipes or Conduits, of which the following is a specification.

This invention relates to an improvement in pipes or conduits adapted to be utilized to effect the transfer of heat from one material to another.

The object of the invention is to provide a pipe or conduit of this character which brings about a very efficient transfer of heat and which is at the same time so organized as to be capable of wide variation in its use in that it has practically universal adaptability to the various modes of heat exchange, the pipe or conduit being capable of advantageous use either with heating or cooling apparatus or for any apparatus of similar character.

A further object is to provide a pipe or conduit of this character which is of extremely simple construction, which is susceptible of manufacture with facilities ordinarily available and at a comparatively slight cost.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a view in elevation showing one embodiment of the invention;

Figure 2 is a sectional view, taken on line 2—2 of Figure 1, and looking in the direction of the arrows;

Figure 3 is a detail view of one of the transverse tubes.

Referring to the drawings wherein for the sake of illustration is shown one embodiment of the invention, the numeral 10 designates a length or section of a pipe or conduit embodying the present invention which is shown as of circular cross section, being in general of cylindrical form but which may be of any desired cross section and any suitable shape or form. The pipe may be constructed of metal or any other suitable material but it preferably is constructed of metal especially when used for purposes of heat exchange. A series of small pipes or tubes 11 is provided and each tube of the series extends transversely and preferably diametrically of the main pipe, the ends of the tube being fitted in openings provided therefor in the main pipe and being welded, shrunk, rolled or otherwise suitably secured to the adjacent structure of the main pipe. The tubing of the series 11 are arranged at angular intervals around the longitudinal axis of the main pipe and preferably progress uniformly around the circumference of the pipe from end to end thereof so that they are arranged in substantially spiral form throughout the pipe length. While this arrangement is preferred it may be varied to suit particular conditions within the purview of the present invention. As shown in Figure 3 the tubes 11 also have extending transversely or diametrically therethrough a series of smaller tubes 12, the ends of the small tubes 12 being fitted in openings provided therefor in the tubes 11 and being welded or otherwise suitably secured to the walls of the opening in such tubes 11. These tubes 12 are likewise arranged at angular intervals around the periphery of the tube 11. It is to be understood that while the pipe 10 and tube 11 as well as the tubes 12 are herein shown as of cylindrical form that the form of these elements as well as their cross section and their length or their dimensions in general may be varied as found suitable with respect to the particular use to which the invention is to be put.

With the pipe or conduit constructed as herein described one fluid is caused to flow through the bore or opening of the main pipe 10 wherein it encounters the tubes 11 and flows around the tubes 11 and through the tubes 12. At the same time the fluid or liquid or other fluent material with respect to which a transfer of heat is desired is passed through the openings of the tubes 11 and around the tubes 12 and in this manner a very efficient and thorough transfer or exchange is effected since the different fluids or fluent substances are distributed in the aggregate over a very large area, and since the thin wall of metal which lies between them when so distributed has of course the requisite conductance to bring about the desired results. The sections or pipe lengths 10 may be a part of a stationary conduit or may be embodied in a movable system or any form of heating or cooling system or like form of apparatus.

While I have herein shown and described the preferred form of my invention it is to be understood that various changes in the form and minor details of construction may be resorted to without departing from the spirit of the invention or the spirit and scope of the subjoined claim.

I claim:

A conduit for use in heat exchange apparatus and comprising a main pipe or section and a series of small tubes extending transversely of the main pipe section, the main pipe section having openings in which the ends of the small tubes are fitted and suitably secured, the small tubes of the series being arranged at angular intervals around and along the main pipe section, each tube of the series also having a second series of transverse tubes extending therethrough.

CLAUDY CLARENCE TAYLOR.